United States Patent
Betta et al.

(10) Patent No.: US 8,248,012 B2
(45) Date of Patent: Aug. 21, 2012

(54) METHOD OF DETERMINING THE GAIN OF A BEMF AMPLIFIER AND RELATIVE CONTROL CIRCUIT OF AN INDUCTION ELECTRIC MOTOR

(75) Inventors: Davide Betta, Barzanò (IT); Diego Armaroli, Mortara (IT); Roberto Trabattoni, Oggiona S. Stefano (IT); Marco Ferrari, Voghera (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 345 days.

(21) Appl. No.: 12/638,621

(22) Filed: Dec. 15, 2009

(65) Prior Publication Data

US 2010/0156335 A1    Jun. 24, 2010

(30) Foreign Application Priority Data

Dec. 18, 2008  (IT) ............................... VA2008A0064

(51) Int. Cl.
  *H02P 3/00* (2006.01)
  *H02H 7/08* (2006.01)
(52) U.S. Cl. ................... 318/459; 318/400.26; 318/561; 318/619; 318/615; 318/609; 360/78.04; 360/78.09; 360/294.5; 360/294.6; 700/28; 700/29; 700/31; 700/37; 700/80
(58) Field of Classification Search ............... 360/78.04, 360/78.09, 78.12, 294.5, 294.6; 700/28, 700/29, 31, 37, 33, 80; 318/561, 619, 400.26, 318/615, 609
See application file for complete search history.

(56) References Cited

U.S. PATENT DOCUMENTS

| | | | |
|---|---|---|---|
| 5,768,045 A | 6/1998 | Patton, III et al. | 360/78.04 |
| 5,982,130 A | 11/1999 | Male | 318/615 |
| 6,208,160 B1* | 3/2001 | Boscolo et al. | 324/765.01 |
| 6,392,375 B1* | 5/2002 | Portaluri et al. | 318/459 |
| 6,522,517 B1* | 2/2003 | Edel | 361/143 |
| 6,611,118 B2* | 8/2003 | Abe et al. | 318/687 |
| 6,795,268 B1 | 9/2004 | Ryan | 360/78.04 |
| 6,864,656 B2* | 3/2005 | Abe et al. | 318/560 |
| 7,042,672 B2* | 5/2006 | Brenden et al. | 360/75 |
| 7,088,546 B2* | 8/2006 | Ehrlich | 360/77.02 |
| 7,106,022 B2* | 9/2006 | Brenden et al. | 318/400.34 |
| 7,106,546 B2* | 9/2006 | Galbiati | 360/75 |
| 7,145,742 B2* | 12/2006 | Brenden et al. | 360/75 |

* cited by examiner

*Primary Examiner* — Rita Leykin
(74) *Attorney, Agent, or Firm* — Allen, Dyer, Doppelt, Milbrath & Gilchrist, P.A.

(57) ABSTRACT

A method for determining gain of a back-electromotive force amplifier may include setting an electric motor into a tri-state function mode and storing a first quasi steady-state value for back-electromotive force from the difference signal, and forcing a reference current through the electric motor and determining a first value of the gain of the amplifier for equaling a difference signal to the first quasi steady-state value. The method may further include setting the electric motor into a tri-state function mode a second time and storing a second quasi steady-state value for back-electromotive force from the difference signal, and increasing the first value of the gain by an amount proportional to a difference between the second quasi steady-state value and the first quasi steady-state value.

21 Claims, 3 Drawing Sheets

METHOD OF DETERMINING THE GAIN OF A BEMF AMPLIFIER AND RELATIVE CONTROL CIRCUIT OF AN INDUCTION ELECTRIC MOTOR

FIELD OF THE INVENTION

This invention relates to control systems for the speed of induction electric motors, and, more particularly, to a method and related device for determining the gain of a back-electromotive force (BEMF) amplifier in an induction electric motor.

BACKGROUND OF THE INVENTION

Induction motors are used in many applications for rotating a motor shaft in a direction or in the opposite direction at a certain speed. For example, one application may include using induction motors for moving an arm carrying read/write heads of a hard disk drive (HDD) from a parked position to a position above the disk and vice versa. In these applications, it may be important to precisely control the motor speed to prevent the arm carrying the read/write heads from hitting against a run stop when they are moved off the disk to the parking ramp, preventing possible damage of the read/write heads.

A typical approach for monitoring the speed of an induction electric motor is to sense the back electromotive force (BEMF) induced in the primary winding of the motor by the moving rotor. To this end, the BEMF is sensed with a circuit as depicted in FIG. 1, commonly referred to as "BEMF Amplifier." The equivalent circuit of the induction electric motor is schematically shown within the dashed lines and comprises a generator of BEMF, an inductance Lm, and a resistor Rm of the primary winding. Typically, a sense resistor Rs is connected in series to the primary winding, and the voltage drop on this resistor corresponds to the current $I_M$ flowing through the motor. The motor is connected to a positive voltage supply line VCMP and to a negative voltage supply line VCMN.

The BEMF Amplifier senses voltage drops on the terminals of the motor and on the sense resistor Rs, amplifies the latter through an adjustable gain amplifier A1, and generates a difference signal between the voltage on the terminals of the motor and the amplified voltage. An output signal VOUT is generated as amplified replica of the difference signal by a second gain amplifier A2.

If the motor is driven in DC mode, the contribution given from the inductance Lm to the voltage drop on the terminals of the motor is negligible and the output signal VOUT is:

$$\text{VOUT}=(\text{BEMF}+I_M \cdot \text{Rm}-I_M \cdot \text{Rs} \cdot A1) \cdot A2 \quad (1)$$

By adjusting the value of the gain A1 such to satisfy the following equation:

$$A1=\text{Rm/Rs} \quad (2)$$

results in:

$$\text{VOUT}=\text{BEMF} \cdot A2, \quad (3)$$

that is, the output signal is an amplified replica of the back-electromotive force in the motor. Therefore, the signal VOUT represents the motor speed and does not depend on the current $I_M$ flowing through the motor.

This characteristic of the signal VOUT is particularly useful to control the motor of a HDD or a similar system when the supply line is unintentionally interrupted, situation commonly referred to as "power down" condition. When a power down condition occurs, it may be necessary to park the read/write heads to prevent them from staying over the disk, thus preventing any risk of damaging the surface of the disk with a consequent loss of data. The fact that the signal VOUT does not depend on the current $I_M$ makes it track the BEMF both during the normal functioning as well as when the supply line of the motor is unintentionally interrupted.

The equivalent resistance of the motor Rm is not known a priori and varies with the functioning temperature, thus it may be necessary to adjust the gain A1 such to satisfy equation (2). Indeed, this adjustment is carried out with the rotor locked (BEMF=0) in a certain position. In these conditions, it is possible to supply current to the motor and ensure that the motor may not start running. The adjustment includes varying the gain A1 until the signal VOUT becomes null. When this occurs, the equation (2) is satisfied.

As stated hereinbefore, the equivalent resistance Rm of the motor varies during its functioning, thus the signal VOUT may not reliably track the BEMF. This may lead to an inaccurate determination of the motor speed. This problem is even more disadvantageous in the case of power down conditions. When a power down occurs, for example, in a HDD, it may be necessary to park the read/write heads and to control accurately the speed of the arm moved by the motor.

If equation (2) is no longer verified because the equivalent resistance Rm of the motor has varied, it may be necessary to repeat the step of determining the gain A1. This is not possible with the previously described technique because in general the condition BEMF=0 is not verified and it is likely not possible to be sure that the rotor is locked to force a current through the motor without moving it.

SUMMARY OF THE INVENTION

An object is to determine the gain of a BEMF amplifier and the actual speed of the motor without blocking the rotor.

Another object is a method for adjusting the gain of a BEMF amplifier when the speed of the motor is unknown and the rotor is not locked.

According to the method, the motor is set in a high impedance state (tri-state) and the back electromotive force on its terminals is read, thus a constant pre-established current is forced through the motor, and the gain A1 of the BEMF amplifier is adjusted a first time such to make the output signal VOUT correspond to the previously sensed back electromotive force $\text{BEMF}_0$. As soon as this condition is verified, the motor is tri-stated again and the back electromotive force $\text{BEMF}_1$ on its terminals is read again. The correction of the previously adjusted value of the gain A1 is determined in function of the values of the back electromotive force.

Another aspect is directed to a control circuit of an induction motor comprising a state machine that executes the method of determining the gain of the BEMF amplifier when a power down condition of the supply line of the motor occurs.

DETAILED DESCRIPTION OF THE PREFERRED EMBODIMENTS

Figure 1:
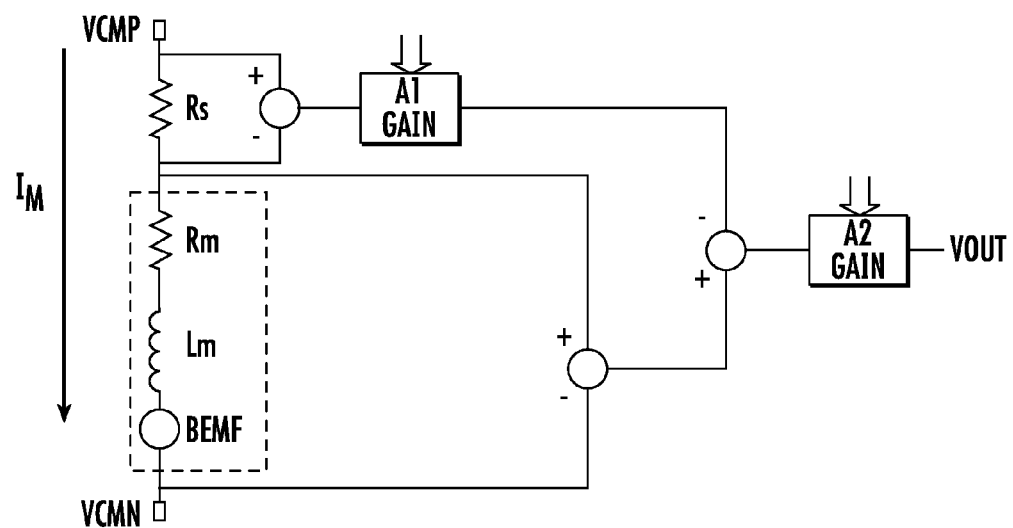
FIG. 1 depicts a schematic circuit diagram of a BEMF amplifier, according to the prior art.
Figure 2:
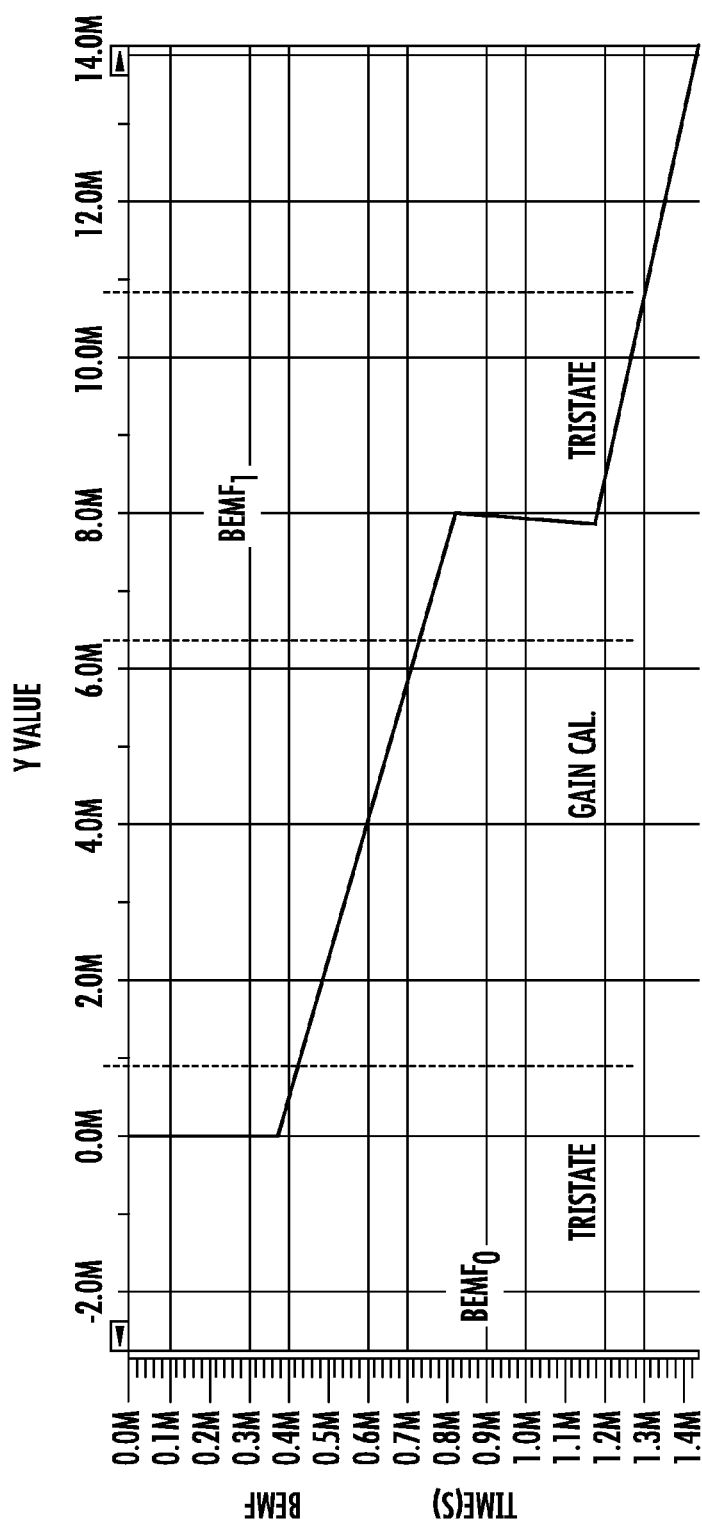
FIG. 2 is a time graph of the BEMF of the motor, according to the present invention.

The three steps of the method for adjusting the gain of the BEMF amplifier are schematically illustrated in the exemplary time graph of FIG. 2. The motor is tri-stated and the back electromotive force (BEMF) $BEMF_0$ on its terminals is sensed by reading the value of the output signal VOUT, given by the following equation:

$$VOUT = BEMF_0 \cdot A2 \quad (4)$$

A pre-established constant current $I_M$ is forced through the motor, and the gain A1* of the BEMF amplifier is adjusted ("GAIN CAL.") in order to make the output signal VOUT equal to the previously sensed value.

In this functioning condition, the back electromotive force $BEMF_1$ of the motor is unknown because the speed at which the rotor is moving is unknown and the output signal VOUT is $$VOUT = (BEMF_1 + I_M \cdot Rm - I_M \cdot Rs \cdot A1^*) \cdot A2 \quad (5).$$

The gain A1* has been determined such to satisfy equation (4), thus:

$$BEMF_0 = BEMF_1 + I_M \cdot Rm - I_M \cdot Rs \cdot A1^* \quad (6).$$

By tri-stating the motor a second time, the back electromotive force $BEMF_1$ is sensed and the difference between the gain A1* and the value of the ratio Rm/Rs between the equivalent resistance of the motor Rm and the sense resistance Rs is determined:

$$\frac{Rm}{Rs} - A1^* = (BEMF_0 - BEMF_1) \cdot \frac{1}{I_M \cdot Rs}. \quad (7)$$

The back electromotive forces $BEMF_0$ and $BEMF_1$ have been measured, the current $I_M$ and the sense resistance Rs are design parameters, thus with equation (7), the difference between the ideal gain Rm/Rs and the previously determined gain A1* is calculated, correcting the latter such to make the output signal VOUT independent from the current flowing through the motor.

An aspect of the method is the fact that after the calibration step, the system may work in a continuous mode and not in a discontinuous mode. This prevents generation of switching noise at audible frequency. The method may be executed during the normal functioning of the motor to adjust the value of the gain A1 such to consider fluctuations of the equivalent resistance of the motor.

It may be conveniently implemented even in case of eventual power down condition of the supply of the motor, to adjust the gain A1 of the BEMF amplifier such to control precisely the motor speed. This characteristic is very useful in applications that contemplate the execution of an emergency procedure in case of power down condition, such as, for example, for parking the HDD read/write heads ("emergency retract").

In HDDs, the emergency retract procedure is executed in case of power down condition for moving the heads away from the disk and bringing them in a parking zone. This may be done safely because, with this method, when a power down condition occurs, the output signal VOUT of the BEMF amplifier tracks precisely the back electromotive force BEMF.

Figure 3:
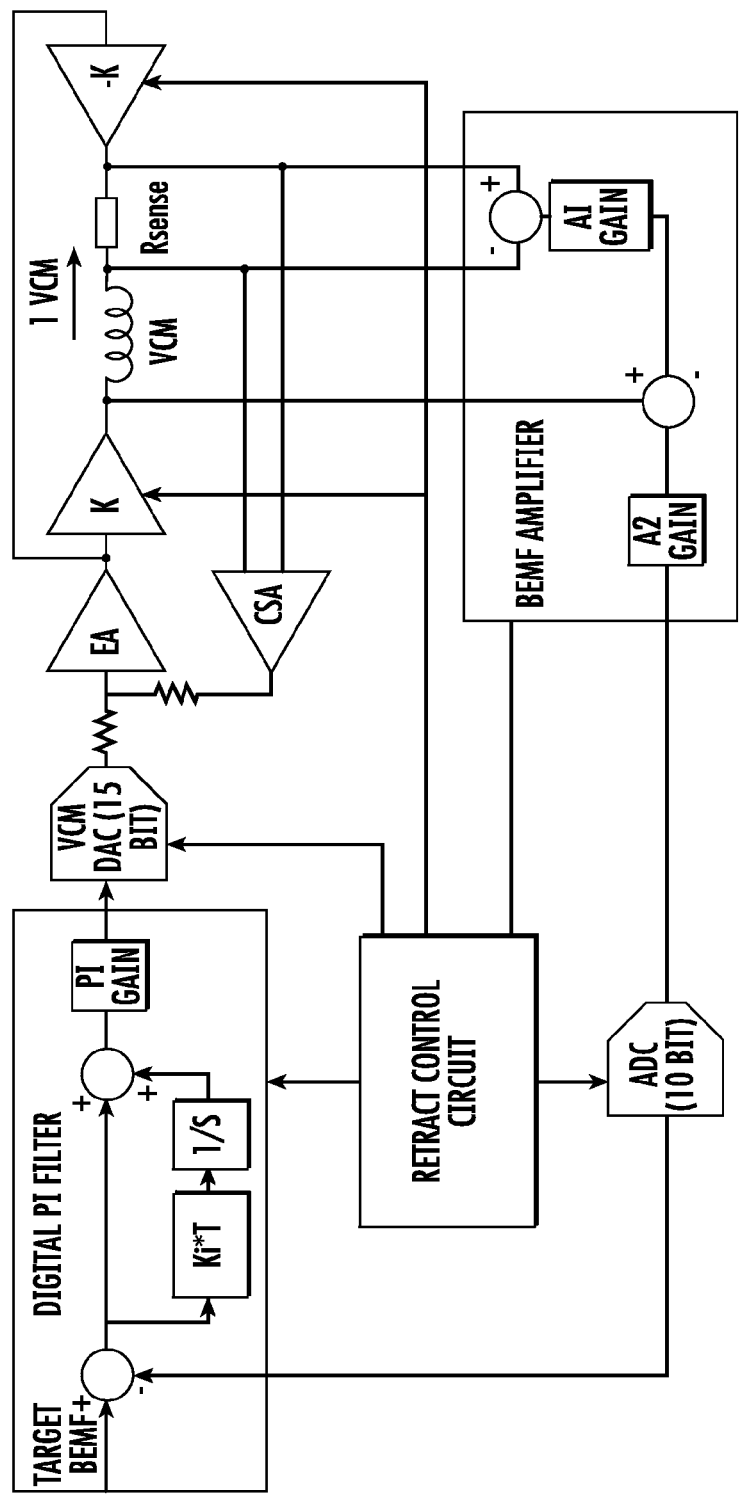
FIG. 3 is a schematic circuit diagram of a control circuit of a HDD, comprising a BEMF amplifier connected to a retract control circuit for parking the heads in a power down condition occur, according to the present invention.

FIG. 3 depicts a control device of a voice-coil motor VCM for carrying out the emergency retract procedure by adjusting the gain A1 of the BEMF amplifier when a power down condition occurs. The meaning of each block is specified in the following table:

| | |
|---|---|
| Retract Control Circuit | State machine that enables the "emergency retract" procedure by commanding the determination of the gain A1 of the BEMF Amplifier and controlling the arm carrying the heads in the parking zone |
| Target BEMF | Reference value for the back electromotive force |
| DAC | Digital-to-analog converter |
| ADC | Analog-to-digital converter |
| VCM | Voice-coil motor |
| CSA | Amplifier of the voltage on the sense resistance |
| EA | Error amplifier |
| PI Gain | PI controller |
| Digital PI Filter | Proportional-integral controller of the speed |

The procedure for determining the gain A1 is executed by the state machine retract control circuit periodically or in case of a power down condition before driving the motor such to park safely the heads of a HDD.

That which is claimed:

1. A method of determining gain of a back-electromotive force (BEMF) amplifier in a circuit comprising an electric motor coupled in series with a sense resistor, the BEMF amplifier having a gain to be adjusted for generating an amplified replica signal of a first voltage drop on the sense resistor, and an adder for generating a difference signal between a second voltage drop on the electric motor and the amplified replica signal, the method comprising:
   setting the electric motor into a tri-state function mode and storing a first quasi steady-state value for BEMF from the difference signal;
   forcing a reference current through the electric motor and determining a first value of the gain of the BEMF amplifier for equaling the difference signal to the first quasi steady-state value;
   setting the electric motor into a tri-state function mode a second time and storing a second quasi steady-state value for BEMF from the difference signal; and
   increasing the first value of the gain by an amount proportional to a difference between the second quasi steady-state value and the first quasi steady-state value.

2. The method according to claim 1 wherein the first value of the gain is based upon $$BEMF_0 = BEMF_1 + I_M \cdot Rm - I_M \cdot Rs \cdot A1^*;$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

3. The method according to claim 1 wherein the increasing of the first value of the gain value is based upon $$\frac{Rm}{Rs} - A1^* = (BEMF_0 - BEMF_1) \cdot \frac{1}{I_M \cdot Rs};$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

4. A method of determining gain of a back-electromotive force (BEMF) amplifier in a circuit comprising an electric motor coupled in series with a sense resistor, the BEMF amplifier having a gain to be adjusted for generating an amplified replica signal of a first voltage drop on the sense resistor, and a circuit for generating a difference signal between a second voltage drop on the electric motor and the amplified replica signal, the method comprising:
   setting the electric motor into a tri-state function mode and storing a first quasi steady-state value for BEMF from the difference signal;
   forcing a reference current through the electric motor and determining a first value of the gain of the BEMF amplifier for matching the difference signal to the first quasi steady-state value;
   setting the electric motor into a tri-state function mode a second time and storing a second quasi steady-state value for BEMF from the difference signal; and
   changing the first value of the gain by an amount based upon a difference between the second quasi steady-state value and the first quasi steady-state value.

5. The method according to claim 4 wherein the first value of the gain is based upon $$BEMF_0 = BEMF_1 + I_M \cdot Rm - I_M \cdot Rs \cdot A1^*;$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

6. The method according to claim 4 wherein the changing of the first value of the gain value is based upon $$\frac{Rm}{Rs} - A1^* = (BEMF_0 - BEMF_1) \cdot \frac{1}{I_M \cdot Rs};$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

7. A control circuit of an electric motor having a sense resistor coupled in series therewith, the control circuit comprising:
   a back-electromotive force (BEMF) amplifier configured to generate an amplified replica signal of a first voltage drop on the sense resistor;
   an adder configured to generate a difference signal between a second voltage drop on the electric motor and the amplified replica signal; and
   a state machine configured to detect changes in a supply voltage of the electric motor, to control the electric motor, and to determine a gain when the change is detected by at least
      setting the electric motor into a tri-state function mode and storing a first quasi steady-state value for BEMF from the difference signal,
      forcing a reference current through the electric motor and determining a first value of the gain of said BEMF amplifier for equaling the difference signal to the first quasi steady-state value,
      setting the electric motor into a tri-state function mode a second time and storing a second quasi steady-state value for BEMF from the difference signal, and
      increasing the first value of the gain by an amount proportional to a difference between the second quasi steady-state value and the first quasi steady-state value.

8. The control circuit according to claim 7 wherein the first value of the gain is based upon $$BEMF_0 = BEMF_1 + I_M \cdot Rm - I_M \cdot Rs \cdot A1^*;$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

9. The control circuit according to claim 7 wherein the increasing of the first value of the gain value is based upon $$\frac{Rm}{Rs} - A1^* = (BEMF_0 - BEMF_1) \cdot \frac{1}{I_M \cdot Rs};$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

10. A control circuit of an electric motor having a sense resistor coupled in series therewith, the control circuit comprising:
   a back-electromotive force (BEMF) amplifier configured to generate an amplified replica signal of a first voltage drop on the sense resistor;
   a circuit configured to generate a difference signal between a second voltage drop on the electric motor and the amplified replica signal; and
   a controller configured to detect changes in a supply voltage of the electric motor, to control the electric motor, and to determine a gain when the change is detected by at least
      setting the electric motor into a tri-state function mode and storing a first quasi steady-state value for BEMF from the difference signal,
      forcing a reference current through the electric motor and determining a first value of the gain of said BEMF amplifier for matching the difference signal to the first quasi steady-state value,
      setting the electric motor into a tri-state function mode a second time and storing a second quasi steady-state value for BEMF from the difference signal, and
      changing the first value of the gain by an amount based upon a difference between the second quasi steady-state value and the first quasi steady-state value.

11. The control circuit according to claim 10 wherein the first value of the gain is based upon $$BEMF_0 = BEMF_1 + I_M \cdot Rm - I_M \cdot Rs \cdot A1^*;$$

and wherein A1* is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

12. The control circuit according to claim 10 wherein the changing of the first value of the gain value is based upon $$\frac{Rm}{Rs} - A1^* = (BEMF_0 - BEMF_1) \cdot \frac{1}{I_M \cdot Rs};$$

and wherein $A1^*$ is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

13. A hard disk drive comprising:
a control arm configured to carry read/write heads;
a voice-coil motor coupled to said control arm and configured to move said control arm; and
a control circuit for said voice-coil motor and comprising
a sense resistor coupled in series to the electric motor,
a back-electromotive force (BEMF) amplifier configured to generate an amplified replica signal of a first voltage drop on said sense resistor,
a circuit configured to generate a difference signal between a second voltage drop on the electric motor and the amplified replica signal, and
a controller configured to detect changes in a supply voltage of the electric motor, to control the electric motor, and to determine a gain when the change is detected by at least
setting the electric motor into a tri-state function mode and storing a first quasi steady-state value for BEMF from the difference signal,
forcing a reference current through the electric motor and determining a first value of the gain of the BEMF amplifier for matching the difference signal to the first quasi steady-state value,
setting the electric motor into a tri-state function mode a second time and storing a second quasi steady-state value for BEMF from the difference signal, and
changing the first value of the gain by an amount based upon a difference between the second quasi steady-state value and the first quasi steady-state value.

14. The hard disk drive according to claim 13 wherein the changing of the first value of the gain comprises increasing the first value of the gain.

15. The hard disk drive according to claim 13 wherein said controller comprises a state machine.

16. The hard disk drive according to claim 13 wherein said circuit to generate the difference signal comprises an adder.

17. The hard disk drive according to claim 13 wherein said controller is to be coupled to said BEMF amplifier.

18. The hard disk drive according to claim 13 wherein said control circuit further comprises an analog-to-digital converter to be coupled to said BEMF amplifier and configured to receive an output thereof.

19. The hard disk drive according to claim 18 wherein said control circuit further comprises a proportional-integral controller configured to receive an output of said analog-to-digital converter.

20. The hard disk drive according to claim 13 wherein the first value of the gain is based upon $BEMF_0 = BEMF_1 + I_M \cdot Rm - I_M \cdot Rs \cdot A1^*;$ and wherein $A1^*$ is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

21. The hard disk drive according to claim 13 wherein the changing of the first value of the gain value is based upon $$\frac{Rm}{Rs} - A1^* = (BEMF_0 - BEMF_1) \cdot \frac{1}{I_M \cdot Rs};$$

and wherein $A1^*$ is the first value of the gain, $R_m$ is an equivalent resistance of the electric motor, $R_s$ is a resistance of the sense resistor, $I_M$ is the reference current, $BEMF_0$ is the first quasi steady-state value, and $BEMF_1$ is the second quasi steady-state value.

* * * * *